May 8, 1951  G. W. CRABTREE  2,551,930

HYDRAULIC SPRING CONTROLLING DEVICE

Filed Nov. 10, 1948  5 Sheets-Sheet 1

INVENTOR.
GEORGE W. CRABTREE
BY
[signature]
ATT.

May 8, 1951  G. W. CRABTREE  2,551,930
HYDRAULIC SPRING CONTROLLING DEVICE
Filed Nov. 10, 1948  5 Sheets-Sheet 2
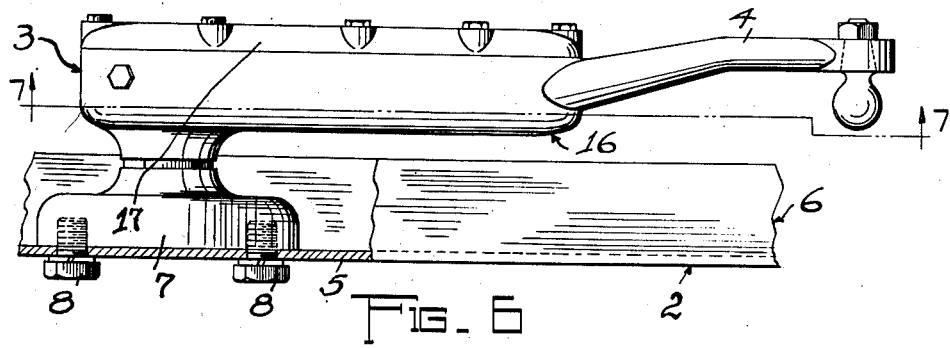
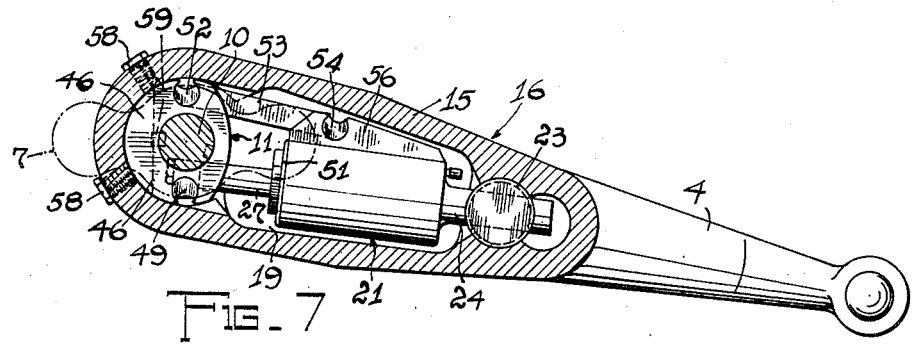
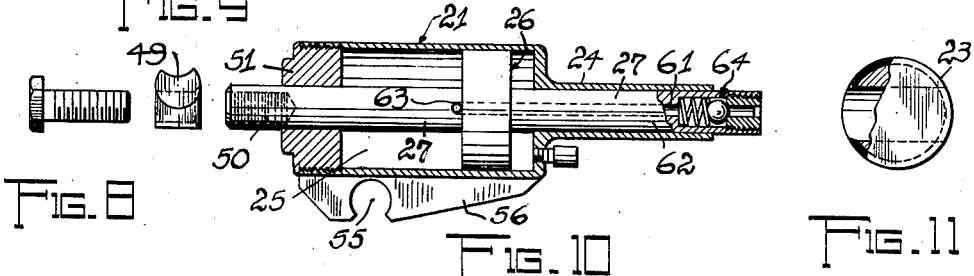
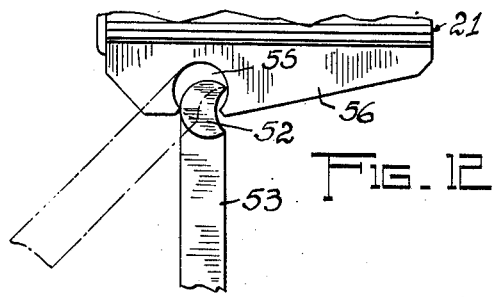
INVENTOR.
GEORGE W. CRABTREE
BY
Gustav A. Wolff
ATT.

May 8, 1951  G. W. CRABTREE  2,551,930
HYDRAULIC SPRING CONTROLLING DEVICE
Filed Nov. 10, 1948  5 Sheets-Sheet 3
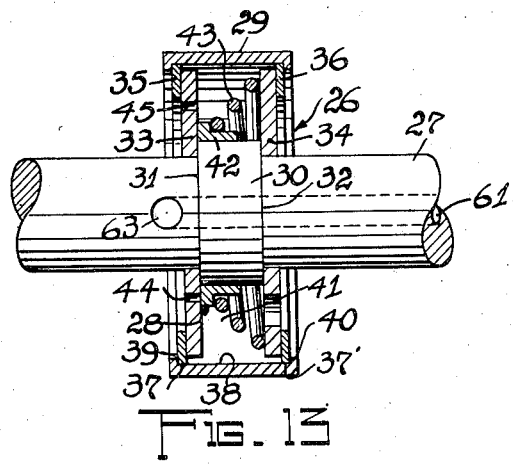
Fig. 13
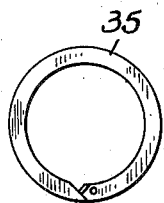 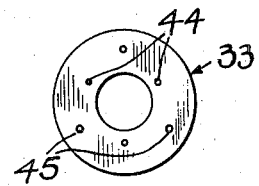 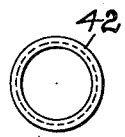 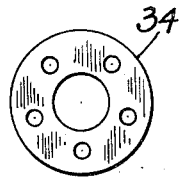
Fig. 14   Fig. 15   Fig. 16   Fig. 17
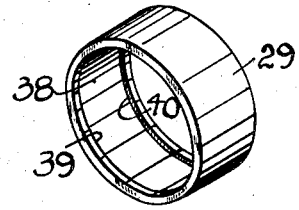 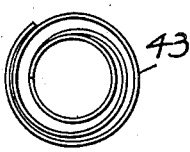 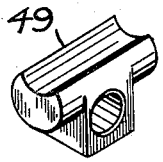
Fig. 18   Fig. 19   Fig. 20
INVENTOR.
GEORGE W. CRABTREE
BY
*Gustav A. Wolff*
ATT.

May 8, 1951     G. W. CRABTREE     2,551,930
HYDRAULIC SPRING CONTROLLING DEVICE
Filed Nov. 10, 1948     5 Sheets-Sheet 4
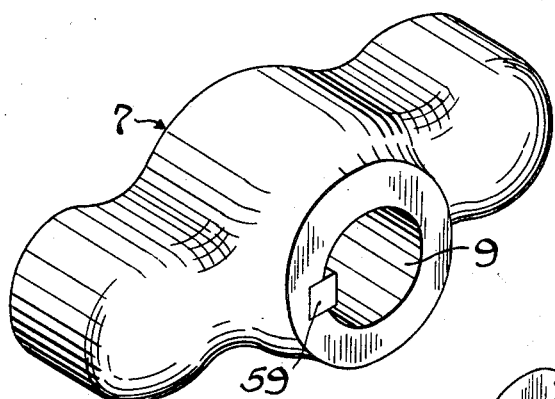
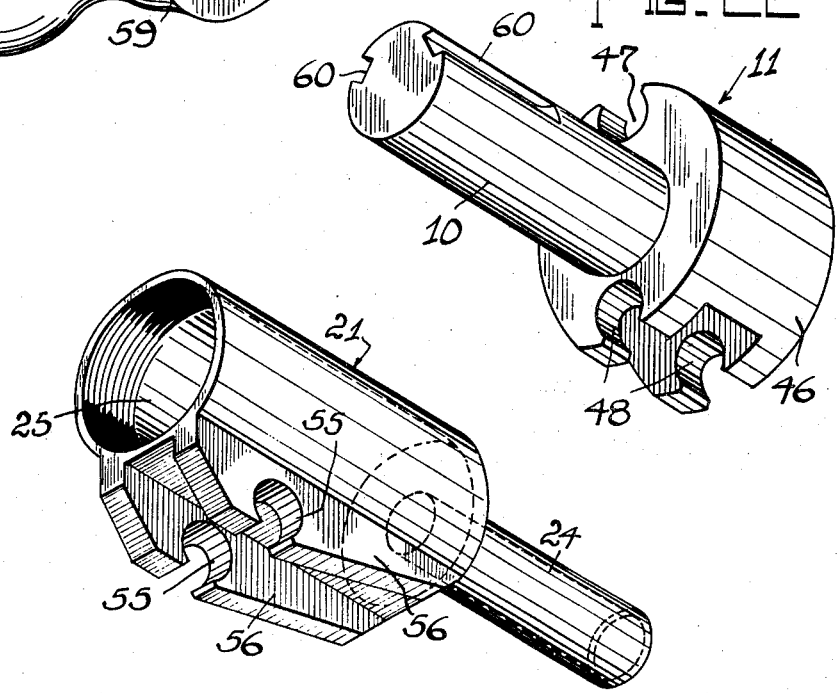
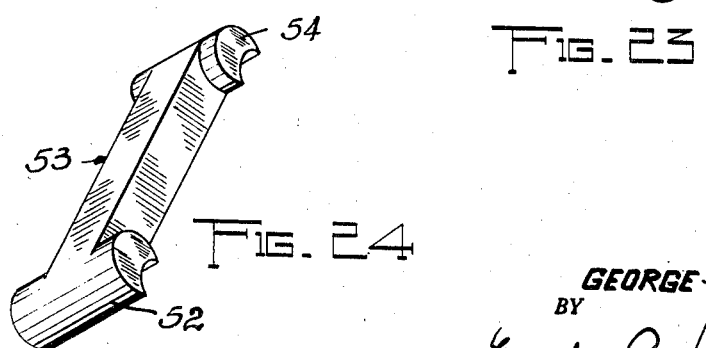
INVENTOR.
GEORGE W. CRABTREE
BY
*Gustav A. Wolff*
ATT.

May 8, 1951          G. W. CRABTREE          2,551,930
HYDRAULIC SPRING CONTROLLING DEVICE
Filed Nov. 10, 1948          5 Sheets-Sheet 5

INVENTOR.
GEORGE W. CRABTREE
BY
Gustav A. Wolff
ATT.

Patented May 8, 1951

2,551,930

UNITED STATES PATENT OFFICE 2,551,930

HYDRAULIC SPRING CONTROLLING DEVICE

George W. Crabtree, Cleveland Heights, Ohio

Application November 10, 1948, Serial No. 59,338

16 Claims. (Cl. 188—88)

The present invention relates to spring controlling means and, more particularly, to hydraulic spring controlling means adapted to check or retard movements of vehicle springs under compression and their reflex actions under rebound. Hydraulic spring controlling means effect proper control of springs by forcible displacement of liquid from one chamber to another and vice versa, and are fully effective only when their working chambers are properly filled with liquid to prevent forming of air and vapor bubbles in the liquid to be displaced.

The general object of this invention is the provision of an improved hydraulic spring controlling device having a pivotally supported, chambered housing which mounts cooperating, axially aligned and axially shiftable, intersleeved hydraulic members, the members being coupled for actuation with a single element axially aligned with the pivot axis of said housing to effect axial shifting of the members in opposite directions with respect to each other, and displacing of liquid in one of said members by the other one when the housing is oscillated on its pivot.

Another object of the invention is the provision of a hydraulic spring controlling device embodying a pivotally supported chambered housing mounting an axially shiftable cylinder piston member, the cylinder and piston of which are coupled with an actuating element pivotally supporting said housing, so that the actuating element effects axial shifting of the cylinder and piston in opposite directions with respect to each other for displacing the liquid in the cylinder by said piston when the housing is oscillated on its pivotal support.

A further object of the invention is the provision of a hydraulic spring controlling device, including a pivotally supported housing which mounts cooperating, axially shiftable cylinder and piston means, and actuating means pivotally supporting said housing and pivoted to the cylinder and piston means so as to effect their axial shifting in opposite directions with respect to each other for displacing liquid in the cylinder means by the piston means when the housing is oscillated on its pivotal support.

Still another object of the invention is the provision of a hydraulic spring controlling device of the type disclosed above, which is constructed to permit differential choking of the liquid while being displaced in the cylinder for differential checking of compression and reflex action of a spring, the device being usable as a left-handed or right-handed structure by inverting the position of the cylinder piston means in the housing.

A still further object of the invention is the provision of a hydraulic spring controlling device of the type referred to above which includes means effecting, by relative movements of the cylinder and the piston means with respect to each other, feeding of liquid into the cylinder means so as to continuously keep the cylinder means properly filled and avoid forming of air and vapor bubbles in the liquid-filled cylinder.

Still further objects and novel features of the invention by which the above and other desirable objects and superiorities are attained, are clearly set forth in the following specification and the appended claims; and a preferred form of embodiment of the invention is hereinafter shown with reference to the accompanying drawing forming part of the specification.

In the drawing:

Fig. 6 is a plan view similar to Fig. 1 showing the hydraulic spring controlling device used as a left-handed shock absorber.

Fig. 7 is a transversal sectional view partly in elevation of the hydraulic spring controlling device shown in Fig. 6, the section being taken on line 7—7 of Fig. 6.

Figs. 8 through 11 are views partly in section of the cylinder piston member of the device; thus Fig. 8 is a plan view of the bolt member securing the T-shaped head portion to one end of the piston rod.

Fig. 9 is a plan view of the T-shaped head portion.

Fig. 10 is a sectional view through the cylinder with the piston mounted therein; and Fig. 11 is a plan view of the swivel guide member for the reduced extension of the cylinder.

Fig. 12 is an enlarged fragmentary plan view showing the pivotal engagement of the operating link with the cylinder.

Fig. 13 is an enlarged fragmentary sectional view through the piston assembly of the hydraulic spring controlling device.

Figs. 14 through 19 show the individual elements of the piston assembly; thus

Fig. 14 is a plan view of one of the snap and sealing ring members.

Fig. 15 a plan view of the perforated sealing disk.

Fig. 16 a plan view of the valve member.

Fig. 17 a plan view of the perforated end disk.

Fig. 18 a perspective view of the tubular piston housing; and

Fig. 19 a plan view of the cone-shaped valve spring.

Fig. 20 is a perspective view of the T-shaped head portion for the outer end of the piston rod.

Fig. 21 is a perspective view of the bracket for mounting the hydraulic spring controlling device.

Fig. 22 is a perspective view of the actuating member for the cylinder piston unit.

Fig. 23 is a perspective view of the cylinder, and

Fig. 24 a perspective view of the operating link connecting the cylinder with the actuating member.

Figure 25:
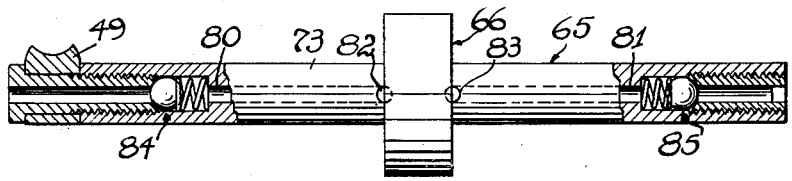
Figure 26:
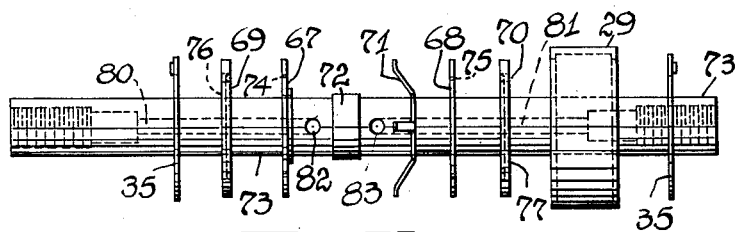

Fig. 25 is a side view partly in elevation of a somewhat modified form of the piston member, and Fig. 26 is a side view showing the individual elements of the modified form of the piston member disclosed in Fig. 25, the elements being shown supported on the piston rod prior to their assembly.

Figure 27:
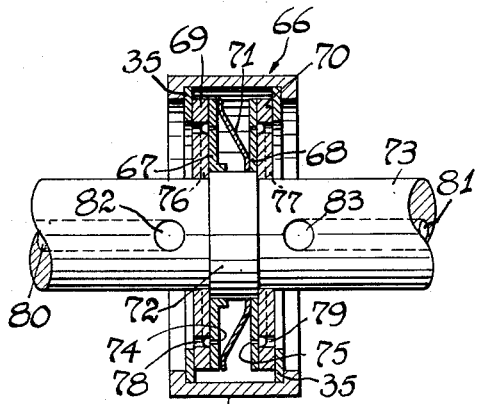

Fig. 27 is an enlarged fragmentary sectional view through the piston member shown in Figs. 25 and 26 when assembled.

Figure 28:
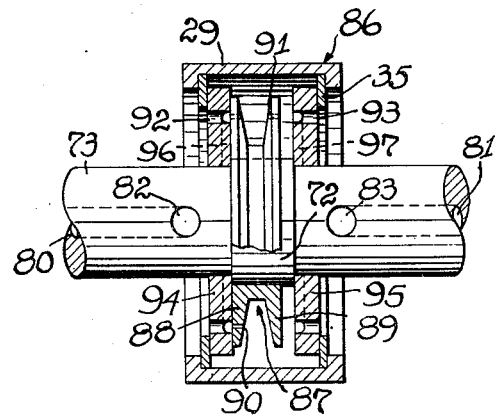
Figure 29:
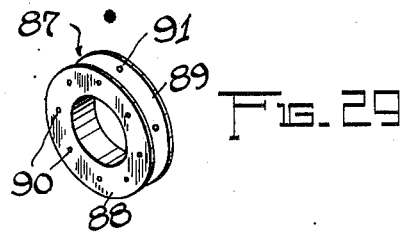

Fig. 28 is an enlarged fragmentary sectional view through another modified piston assembly, and Fig. 29 is a perspective view of the shiftable valve member of the modified piston assembly shown in Fig. 28.

Referring now in detail to the exemplified form of the invention shown in the drawing, numeral 2 denotes the frame structure of an automobile, which structure, as customary, is yieldingly supported on axles by means of coil or leaf springs (not shown). Frame structure 2 mounts a hydraulic spring controlling device 3, the extended lever arm portion 4 of which is connected to the respective axle (not shown) to effect a check on the movements between frame 2 and the axle and reflex actions of springs (not shown) yieldingly connecting, as customary, frame and axles. Thus, frame 2 mounts on the web portion 5 of its channel 6 a supporting bracket 7 rigidly secured to said frame by means of cap screws 8. This bracket non-rotatably supports in a bore 9, the shaft-like portion 10 of an actuating member 11, later to be described, which shaft-like portion is extended through a bore 14 into the chambered base portion 15 of housing 16 to rotatably support such housing for shock absorbing operations of the spring controlling device. The base portion of housing 16 is fluid-tightly closed by a cover member 17 secured to the base portion by screw members 18. Housing 16 mounts in its working chamber 19 a cylinder piston type spring controlling unit 20 having an axially shiftable cylinder 21, an axially shiftable piston member 22, the actuating member 11 and a bearing sleeve 23 axially shiftably and freely rotatably mounting a tubular portion 24 extended from the rear end of cylinder 21 to axially slidably and pivotally support the cylinder for a purpose later to be described. Cylinder 21 slidably mounts in its cylinder chamber 25 the piston member 22 including a piston assembly 26 mounted on a piston rod 27 (see Figs. 13 through 19). This piston assembly embodies shiftable means 28 adapted to check in shock absorbing operations the flow of liquid from one end of cylinder chamber 25 to its other end and a tubular housing 29 mounting said shiftable means, which tubular housing is axially fixedly and laterally shiftably mounted on piston rod 27 and dimensioned to closely fit the bore of cylinder 21. To properly mount piston assembly 26 on piston rod 27, the central portion of this rod embodies an enlarged section 30 which forms piston rod 27 with spaced, ring-shaped shoulders 31 and 32 contacted by perforated disks 33 and 34 sleeved upon piston rod 27 from opposite sides thereof. These disks provide supporting means for the axially fixed and laterally shiftable tubular housing 29 which is held in proper position by sealing snap rings 35, 36 engaging with their peripheral surfaces 37, 37', the recessed inner wall 38 of housing 29 and with their side walls, disks 33, 34 and circular shoulders 39 and 40 at the opposite ends of tubular housing 29. This arrangement locks housing 29 against axial movements and permits lateral shifting of said housing as disks 33 and 34 are smaller in diameter than the inside diameter of the recessed portion of housing 29. The ring-shaped space 41 between disks 33 and 34 has arranged therein the previously referred to shiftable checking means 28 consisting of a shouldered ring-shaped valve member 42 which is slidably mounted on the enlarged section 30 of piston rod 27 and a compression spring 43 yieldingly forcing the valve member 42 into contact with disk 33 for a purpose later to be described.

In shock absorbing operation, the thus constructed piston assembly when shifted axially in cylinder chamber 25 retards and chokes the liquid displaced by the piston member from one end of cylinder chamber 25 to its other end. Such retarding and choking action is effected by disk 33 which includes valve controlled inner perforations 44 and uncontrolled outer perforations 45. The inner perforations 44 are controlled by the valve member 42 which is automatically shifted to open the perforations 44 when piston assembly 26 travels toward the left so that the fluid in cylinder chamber 25 forces valve member 42 away from disk 33 and is automatically forced into engagement with disk 33 to cover perforations 44 when piston assembly 26 travels in an opposite direction. Compression spring 43 tends to yieldingly shift valve member 42 toward disk 33. The fluid passes through piston assembly 26 only through the perforations 44 and 45 as the sealing snap ring 35 fluid-tightly seals this disk to tubular housing 29 and piston rod 27.

Axial shifting of cylinder 21 and piston member 22 is effected by rocking movements of housing 16 on the shaft-like portion 10 of actuating member 11, which member embodies a coupling head 46 positioned within working chamber 19 and coupled with cylinder 21 and piston member 22. This coupling head is formed with substantially oppositely arranged pairs of spaced circular slots 47 and 48 of which slots 47 rotatably mount a T-shaped head portion 49 attached to the end portion 50 of piston rod 27, which end portion is extended through the cylinder head 51, and of which slots 48 are rotatably engaged with the T-shaped end portion 52 of an I-link member 53, having its other T-shaped end portion 54 rotatably secured in a pair of circular slots 55 arranged in parallel ribs 56 of cylinder 21. Preferably the slots 47, 48 and 55 and T-shaped head and end portions 49, 52 and 54 are constructed to permit their assembly and disassembly only in predetermined positions.

The opposed location of the pairs of slots 47 and 48 effects shifting of cylinder 21 and piston member 22 simultaneously in opposite directions with respect to each other when the housing 16 of the spring controlling device is rocked on the shaft-like portion 10 of actuating member 11.

The housing 16 of the spring controlling device and the cylinder 21 are completely filled with a suitable liquid, openings 57 closed by cap screws 58 serving to fill housing 16 so that the spring controlling unit 20 is arranged in a liquid-filled housing.

When attached to an automobile, the device has its housing 16 pivotally supported on the shaft-like portion 10 of actuating member 11 which portion is extended into the bore 9 of bracket 7 attached to frame 2 and which is keyed to the bracket by a key 59 engaging one of two keyways 60 in shaft-like portion 10. The lever arm portion 4 of housing 16 is coupled with the respective axle of the automobile to effect actuation of the spring controlling unit 20 when, in spring action between body and chassis, housing 16 is oscillated. The oscillatory movements of housing 16 are transformed to reciprocatory movements of cylinder 21 and piston member 22 which reciprocate in opposite directions with respect to each other, and these reciprocatory movements displace in cylinder 21 liquid from one side of piston member 22 through the perforations 44 and 45 in disk 33 to the other side of said piston and vice versa.

Proper operation of the spring controlling unit of the device is made possible by continuous automatic refill of liquid leaked out of the spring controlling unit 20. This is effected by a valve controlled passage 61 in the end portion 62 of piston rod 27 which passage through a cross passage 63 communicates with the cylinder chamber 25. The passage 61 in piston rod 27 is controlled by a check valve 64 arranged in the end portion 62 of piston rod 27 which end portion is guided within and extended through tubular portion 24 of cylinder 21. The check valve 64 permits entering of liquid from working chamber 19 into the cylinder chamber 25 when piston member 22 travels away from the cylinder head 51, such movement of the piston reducing the pressure in the front portion of the cylinder, and such liquid is prevented from being fed back into the working chamber when piston member 22 travels in the opposite direction.

The thus constructed spring controlling device encloses all operating parts of the spring controlling unit in a liquid filled working chamber not subjected to pressures and leakage of liquid from the spring-controlling unit is automatically fed back into the unit so that there is practically no loss of operating liquid, assuring under all conditions proper operation of the controlling device and its controlling unit.

Figure 1:
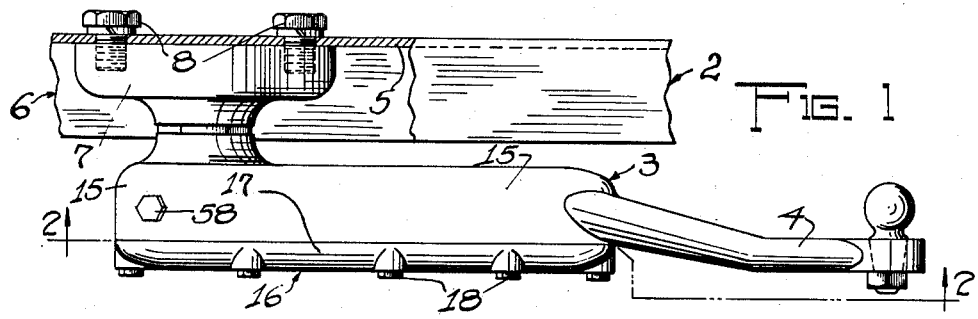
Fig. 1 is a plan view, partly broken away, showing a hydraulic spring controlling device built in accordance with the invention attached to the frame of a vehicle, the device being used as a right-handed shock absorber.
Figure 2:
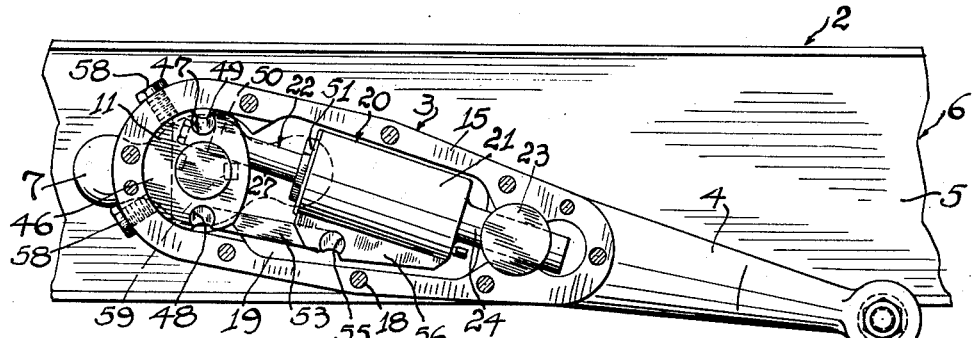
Fig. 2 is a transversal sectional view, partly in elevation of the hydraulic spring controlling device shown in Fig. 1, the section being taken on line 2—2 of Fig. 1.
Figure 3:
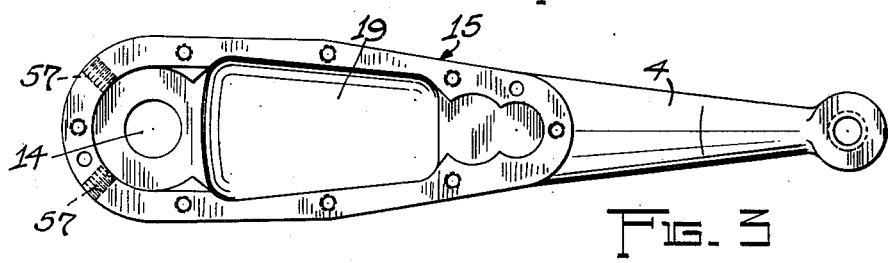
Fig. 3 is a side view of the base member of the housing of the hydraulic spring controlling device.
Figure 4:
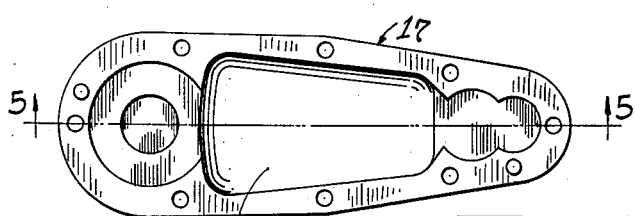
Fig. 4 is a side view of the cover member of the housing of the hydraulic spring controlling device.
Figure 5:
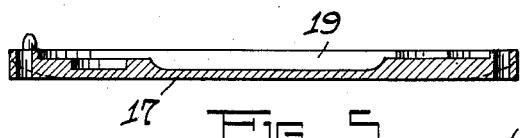
Fig. 5 is a longitudinal sectional view through the cover member, the section being taken on line 5—5 of Fig. 4.

The described spring controlling device can be used either as a left or right-handed hydraulic shock absorber. Thus Figs. 1 and 2 show the device attached to the right side frame of an automobile and Figs. 6 and 7 show the device attached to the left side frame of an automobile. To permit such shifting of the device and its proper operation, the shaft-like portion 10 of actuating member 11 includes the two keyways 60 which are arranged with respect to each other so that in left and right handed position, the housing 16 is related to the respective side member of the frame in proper angular position. In addition cylinder 21 and piston member 22 mounted therein are constructed to be coupled with either one of the pairs of slots 47 and 48 to obtain identical actuation of the spring controlling unit when the spring controlling device is used as left or right-handed shock absorber as clearly disclosed in Figs. 1 and 2 and Figs. 6 and 7, respectively.

The modified form of piston member 65 shown in Figs. 25 through 27 includes a piston assembly 66 formed similar to the piston assembly 26 with the exception that there are provided two valve members 67 and 68 instead of the single valve member 42 used in the piston assembly 26. These two valve members are yieldingly forced into contact with the perforated disks 69 and 70 by a spring member 71 seated on the enlarged central portion 72 of the piston rod 73. The valve members 67 and 68 include perforations 74, 75, respectively, aligned with the circular grooves 76, 77 connecting the respective perforations 78, 79 in the respective perforated disks 69 and 70 to insure the desired flow of liquid through the perforations 74 and 75 in the valve members and the perforations 78, 79 in the disks 69 and 70. In addition piston member 65 includes valve controlled passages 80 and 81 in the piston rod 73, which passages through cross passages 82 and 83, respectively communicate with the cylinder chamber at opposite sides of the piston assembly. Passages 80 and 81 are controlled by check valves 84 and 85 respectively and permit at each forward and back stroke of the piston entering of liquid from the working chamber of the housing into that portion of the cylinder chamber which at that time has its pressure reduced by the respective travel of the piston assembly.

The modified form of piston assembly 86 shown in Fig. 28 is substantially similar to the piston assembly 66 shown in Figs. 25 through 27 with the exception that assembly 86 includes a single double-flanged valve member 87, the flanged portions 88 and 89 of which have extended therethrough perforations 90 and 91 cooperating with the perforations 92 and 93 in the respective perforated disks 94 and 95, the perforations 92 and 93 of which are arranged in circular grooves 96 and 97 for proper cooperation with the perforations 90 and 91 in valve member 87. In piston assembly 86 valve member 87 is not spring controlled but shifted by liquid pressure differences at the opposite sides of the piston assembly when same is reciprocated by oscillatory movements of the housing of the spring controlling device as previously explained in detail.

Having thus described my invention:

What I claim is:

1. A device for checking compression and reflex actions of the springs of an automobile comprising supporting means, a chambered housing pivotally supported by said supporting means, a double-acting hydraulic checking device within said housing consisting of a single cylinder and a single piston shiftably arranged with respect to each other said cylinder being slidably and rotatably mounted in said housing, and said piston being fluid tightly encompassed in said cylinder and actuating means pivotally coupled with said piston and linked to said cylinder, said actuating means being rigidly secured to said supporting means and extended into said housing in axial alignment with its pivot axis.

2. A device for checking compression and reflex actions of the springs of an automobile comprising supporting means, a chambered housing, a double-acting hydraulic checking device within said housing including a single cylinder axially slidably and pivotally supported in said housing and a piston member, said cylinder having a fluid-tightly sealed working chamber enclosing said piston and actuating means within said housing pivotally coupled with said piston and linked to said cylinder, said actuating means embodying a shaft-like portion extended through the wall of said housing and rigidly secured to said supporting means, said shaft-like portion pivotally supporting said housing for actuation of said checking device by oscillatory movements of said housing.

3. A device for checking compression and reflex actions of the springs of an automobile as described in claim 2, wherein the supporting means and the shaft-like portion of said actuating means include coupling and locking means adapted to selectively secure said actuating means to said supporting means in left-handed and right-handed working position of the checking device, wherein said actuating means and said cylinder are linked to each other by a link member, and wherein the coupling connections of said actuating means with said piston and link are interchangeable to permit a change in the working relation of said actuating means and said cylinder necessary for proper use of the checking device on either side of the chassis of an automobile.

4. A device for checking compression and reflex actions of the springs of an automobile comprising a supporting bracket, a chambered housing pivotally supported by said bracket, a hydraulic checking device including a single cylinder axially shiftably and pivotally supported in said housing and a single piston in said cylinder fluid-tightly enclosed therein and actuating means for said checking device coupled with said piston and linked to said cylinder, said actuating means being rigidly secured to said bracket in axial alignment with the pivot axis of said housing.

5. A device for checking compression and reflex actions of the springs of an automobile comprising a supporting bracket, a chambered housing pivotally supported by said bracket, a hydraulic checking device including a single cylinder pivotally and axially shiftably supported in said housing and a piston with piston rod for said cylinder, actuating means for said checking means rigidly secured to said bracket in axial alignment with the pivot axis of said housing, and coupling means connecting said cylinder and the piston rod of said piston with said actuating means said coupling means including identically shaped slots on opposed sides of said actuating means, a coupling element on the piston rod of said piston fitting said slots and a link including coupling end portions fitting said slots and coupled with said cylinder, said actuating means effecting reciprocatory movements of said cylinder and piston with respect to each other by oscillatory movements of said housing.

6. A device for checking compression and reflex actions of the springs of an automobile as described in claim 5, wherein said cylinder is invertibly slidably and rotatably supported in said housing to permit inverting of said cylinder for proper use of the checking device on either side of the chassis of an automobile.

7. A device for checking compression and reflex actions of the springs of an automobile as described in claim 5, wherein said hydraulic checking device communicates with the chamber of said housing through valve-controlled passage means and wherein said valve controlled passage means include a valve controlled axial bore in the piston rod of said piston, said axial bore having one end in open communication with the cylinder chamber and the other end in open communication with the said chambered housing.

8. In a device for checking compression and reflex actions of the springs of an automobile, a pivotally supported chambered housing, a hydraulic checking device within said housing having a cylinder axially shiftably supported in said housing and a piston member within said cylinder, said piston member comprising a piston rod axially slidably extended through opposite walls of said cylinder and a piston assembly axially non-shiftably secured to said piston rod, said piston assembly including a radially, floatingly supported tubular guide member dimensioned to fit the bore of said cylinder and shiftable valve means adapted to control the flow of liquid through said piston assembly.

9. In a device for checking compression and reflex actions of the springs of an automobile, a pivotally supported chambered housing, a hydraulic checking device within said housing embodying a pivotally and axially shiftably mounted cylinder and a piston member for said cylinder, said piston member including a piston rod axially slidably extended through opposite walls of said cylinder, and a piston assembly axially non-shiftably secured to said piston rod between its opposite ends, said piston assembly including perforated disk means, shiftable valve means and a radially floatingly supported tubular guide member dimensioned to fit the bore of said cylinder and said shiftable valve means cooperating with the perforated disk means in controlling flow of liquid through the perforations of said disk means.

10. A device for checking compression and reflex actions of the springs of an automobile as described in claim 9, wherein the piston rod includes a valve controlled axial bore one end of which is in open communication with the cylinder chamber and the other end of which is in open communication with the said chambered housing.

11. A device for checking compression and reflex actions of the springs of an automobile as described in claim 9, wherein the piston rod includes at each end a valve controlled axial bore, each of which bores has its one end communicating with the cylinder adjacent to the piston assembly of the piston member and its other end communicating with the said chambered housing.

12. In a device for checking compression and reflex actions of the springs of an automobile, a double-acting hydraulic checking device including a single axially slidably and pivotally supported cylinder and a piston member for said cylinder, pivotally arranged supporting means for said hydrauic checking device, and stationary means linked at spaced points with said cylinder and pivotally coupled with said piston member to effect reciprocatory movements of said cylinder and piston member in opposite directions with respect to each other by oscillatory movements of said pivotally arranged supporting means.

13. A device for checking compression and reflex actions of the springs of an automobile as described in claim 12, including a link member connecting said cylinder member with said stationary means.

14. A device for checking compression and reflex actions of the springs of an automobile as described in claim 12, wherein said piston member includes a piston rod and a piston assembly radially shiftably and axially fixedly mounted on said piston rod.

15. A device for checking compression and reflex actions of the springs of an automobile as described in claim 12, wherein said piston member includes a piston rod extended through opposite walls of said cylinder axially thereof and a piston assembly radially shiftably and axially fixedly mounted on said piston rod between the opposite ends thereof.

16. A device for checking compression and reflex actions of the springs of an automobile as described in claim 12, wherein said piston member includes a piston rod and a piston assembly radially shiftably and axially fixedly supported thereby, said piston assembly including valve controlled, perforated disk means rigidly secured to said piston rod, a tubular guide and sealing member with an inner diameter larger than the diameter of said disk means, and sealing snap ring means seated in said tubular guide and sealing member and slidably contacting with said perforated disk means to permit radial moving of said tubular guide and sealing member with respect to said piston rod.

GEORGE W. CRABTREE.

REFERENCES CITED

The following references are of record in the file of this patent:

UNITED STATES PATENTS

| Number | Name | Date |
|---|---|---|
| 1,631,039 | Landis | May 31, 1927 |
| 1,752,240 | De Ram | Mar. 25, 1930 |
| 1,829,946 | Schmitt | Nov. 3, 1931 |
| 1,967,169 | Armstrong | July 17, 1934 |
| 1,967,170 | Armstrong | July 17, 1934 |